United States Patent
Garland, Charles et al.

[15] 3,666,098
[45] May 30, 1972

[54] METHOD AND APPRATUS FOR CONFINING AND COLLECTING AN OIL SLICK

[72] Inventors: Charles Garland, Williamsburg; James J. Victory; John P. Latimer, both of Newport News, all of Va.

[73] Assignee: Deepsea Ventures, Inc., Gloucester Point, Va.

[22] Filed: Sept. 8, 1970

[21] Appl. No.: 70,142

[52] U.S. Cl. ........................... 210/83, 210/DIG. 21, 210/242
[51] Int. Cl. ......................................................... B01d 37/00
[58] Field of Search ..................... 210/83, 242, 523, DIG. 21, 210/169, 65

[56] References Cited

UNITED STATES PATENTS

| | | | |
|---|---|---|---|
| 3,365,383 | 1/1968 | Blair | 210/169 |
| 3,476,246 | 11/1969 | Dahan | 210/83 |
| 3,221,884 | 12/1965 | Muller | 210/DIG. 21 |
| 3,565,254 | 2/1971 | Latimer | 210/242 |

FOREIGN PATENTS OR APPLICATIONS

| 1,528,777 | 6/1968 | France | 210/DIG. 21 |
|---|---|---|---|

*Primary Examiner*—Reuben Friedman
*Assistant Examiner*—T. A. Granger
*Attorney*—David H. Semmes

[57] ABSTRACT

Method and apparatus for confining and collecting an oil slick upon the ocean's surface, particularly a method for shielding the oil slick/ambient air interface during collecting of the oil, so as to prevent ingestion of air while maintaining flexibility of the confining and collecting boom.

6 Claims, 12 Drawing Figures

Patented May 30, 1972

INVENTORS
CHARLES GARLAND
JAMES J. VICTORY
JOHN P. LATIMER

BY David H. Semmes

ATTORNEY

INVENTORS
CHARLES GARLAND
JAMES J. VICTORY
JOHN P. LATIMER

INVENTORS
CHARLES GARLAND
JAMES J. VICTORY
JOHN P. LATIMER

Patented May 30, 1972

INVENTORS
CHARLES GARLAND
JAMES J. VICTORY
JOHN P. LATIMER

BY David H. Semmes
ATTORNEY

Patented May 30, 1972 3,666,098

INVENTORS
CHARLES GARLAND
JAMES J. VICTORY
JOHN P. LATIMER

BY David H. Semmes
ATTORNEY

INVENTORS
CHARLES GARLAND
JAMES J. VICTORY
JOHN P. LATIMER

BY David H. Semmes
ATTORNEY

Patented May 30, 1972 3,666,098

INVENTORS
CHARLES GARLAND
JAMES J. VICTORY
JOHN P. LATIMER

BY David H. Semmes
ATTORNEY

METHOD AND APPRATUS FOR CONFINING AND COLLECTING AN OIL SLICK

CROSS-REFERENCES TO RELATED APPLICATIONS

An improvement upon John P. Latimer's METHOD AND APPARATUS FOR CONFINING A SLICK AND COLLECTING OIL THEREFROM (Ser. No. 856,945), filed Sept. 11, 1969 now U.S. Pat. No. 3,565,254. In that application, attention was given to the method for buoyantly supporting the confining and collecting boom, which was provided with lateral perforations for ingestion of oil. An air skirt was provided to prevent the ingestion of air while withdrawing the oil slick into the boom.

The present method concerns the shielding of the lateral perforations in the boom, so as to prevent air ingestion and to stabilize the boom in an attitude for ingesting of oil, instead of water.

BACKGROUND OF THE INVENTION

1. Field of the Invention

A great deal of recent attention has been given to techniques for rapidly confining and collecting an oil spill, so as to limit pollution and ecological damage. Earlier inventors have given particular attention to the development of conduits or booms which can be transported by helicopter or ship and readily deployed for the mission at hand. A principal shortcoming of such devices has been their relative rigidity and lack of flexibility as the boom is pitched and rolled upon the ocean's surface. Apparently, prior art techniques have not provided any means for effectively preventing the ingestion of air into the confining and collecting boom. Also, these prior art devices have not provided techniques for supporting the boom such that its intake ducts are presented within the oil slick, instead of the supporting ocean body.

2. The Prior Art

Simpson — BOOM FOR CONFINING MATERIAL FLOATING ON WATER (U.S. Pat. No. 2,682,151).

This device is intended to surround oil or other material floating on water. An investigation of materials and nature of construction reveals this device to be suited for sheltered water applications with small current and wind conditions.

Wicklander — FLOATING BARRIER (U.S. Pat. No. 2,968,928).

This device is designed to perform as a quick acting oil containment barrier. A hose is used which is filled with buoyant material as it is being deployed.

Murray — MOBILE PNEUMATIC BREAKWATER (U.S. Pat. No. 3,068,655).

This invention consists of a buoyant, floodable pipe-like device which will calm surface waves by using rising bubbles. Although this concept has been used for containment barriers, there is no suggestion of a technique for collecting the oil.

Galvaing — (U.S. Pat. No. 3,184,923).

The portion of this patent which refers to oil collection uses the weir principle.

Hinde — METHODS OF DISTRIBUTING FLUIDS IN BODIES OF LIQUID AND APPARATUS THEREFORE (U.S. Pat. No. 3,293,861).

This invention shows a submerged pipe through which a gas, such as air, may be bubbled and mixed with the surrounding liquid. A unique type of releasing valve is detailed which depends on a slit in a resilient plastic type of pipe. One method claim for this device includes maintaining an ice-free water surface. Also, the concept can be used to contain floating oil.

Hoddinott — WATERWAY DE-ICING APPARATUS (U.S. Pat. No. 3,318,098).

This invention reveals a method for maintaining bodies of water free of ice by bubbling air from a submerged pipeline.

Scarand — COPING ASSEMBLY FOR SWIMMING POOLS (U.S. Pat. No. 3,319,264).

The coping assembly creates a means for cleaning the pool water surface of floating foreign matter passing all of the water through a filter and returning it to the pool.

Dahan — APPARATUS AND PROCESS FOR CONFINING FLOATING LIQUID PRODUCTS (U.S. Pat. Nos. 3,369,664 and 3,476,246).

The oil collecting means of this invention is revealed in U.S. Pat. No. 3,369,664 and improved in U.S. Pat. No. 3,476,246 with additional claims allowed.

The mechanism used to collect oil is basically a trough to which open-ended conduit is attached at intervals. Connections are made to a pumping and storage ship which is not described.

Logan — FLUID RECOVERY SYSTEM AND METHOD (U.S. Pat. No. 3,389,559).

This invention uses a stationary moored, inflated tent to contain oil which is rising from a fixed bottom position. A recovery device inside the tent, which is referred to as a skimmer, is used for oil recovery.

McCormick — PROCESS FOR CONTAINMENT AND DEFLECTION OF AQUEOUS SURFACE POLLUTANTS (U.S. Pat. No. 3,491,023).

This invention uses an underwater air conduit for creating a curtain of air bubbles rising to the surface. With a surface area surrounded by a line of air bubbles, containment of oil is possible. No means for recovery of oil is presented.

The aforelisted patents concern mostly structure for containing an oil slick via a relatively rigid conduit-like barrier. Scarand provides a coping for collection of water from the surface. Earle (U.S. Pat. No. 3,259,245) is a typical belt-type device used for collection of oil within a harbor or confined area.

Conventional skimmer methods such as described in U.S. Pat. No. 3,146,598 and U.S. Pat. No. 3,321,923 uses a floatable bucket-type device which forms a weir over which the oil film will separate from the water and flow into a container.

A variation of the skimmer method is to use a floating skimmer head at the end of a buoyant hose.

This method is workable in quiet waters, but, in rough water, the head will emerge from the water and ingest air frequently. This method is also limited in the quantity of oil which can be recovered since the suction area is very localized and small in dimension compared with a hose.

Straw is also used as a recovery technique. The straw absorbs the oil and then must be mechanically harvested to remove the oil. This method is not illustrated.

SUMMARY OF THE INVENTION

According to the present method and apparatus, oil or other immiscible pollutant is confined and collected by buoyantly supporting a resilient boom having lateral perforations upon the liquid and in contact with the oil slick, drawing suction within the boom so as to move the slick through the perforations and into the boom, while shielding the oil slick and ambient air interface adjacent the sides of said boom and educting oil within said boom so as to advance oil axially away from the perforations to a collecting receptacle. Modifications of invention include varying the buoyancy of the boom according to the specific gravity of the spilled oil, so that the perforations are presented medially of oil slicks in varying depth, weighting of the boom while shielding so as to insure that the oil/air interface is shielded regardless of boom pitch or roll, and configuring the shielding as a foil, so as to reduce effects of ambient wind upon the boom surface.

BRIEF DESCRIPTION OF THE DRAWINGS

FIG. 10 is a perspective view, showing the present boom used in conjunction with a confining boom of the type described in the parent application, the collected discharge being fed to a tanker, standing by;

DESCRIPTION OF THE PREFERRED EMBODIMENTS

Figure 1:
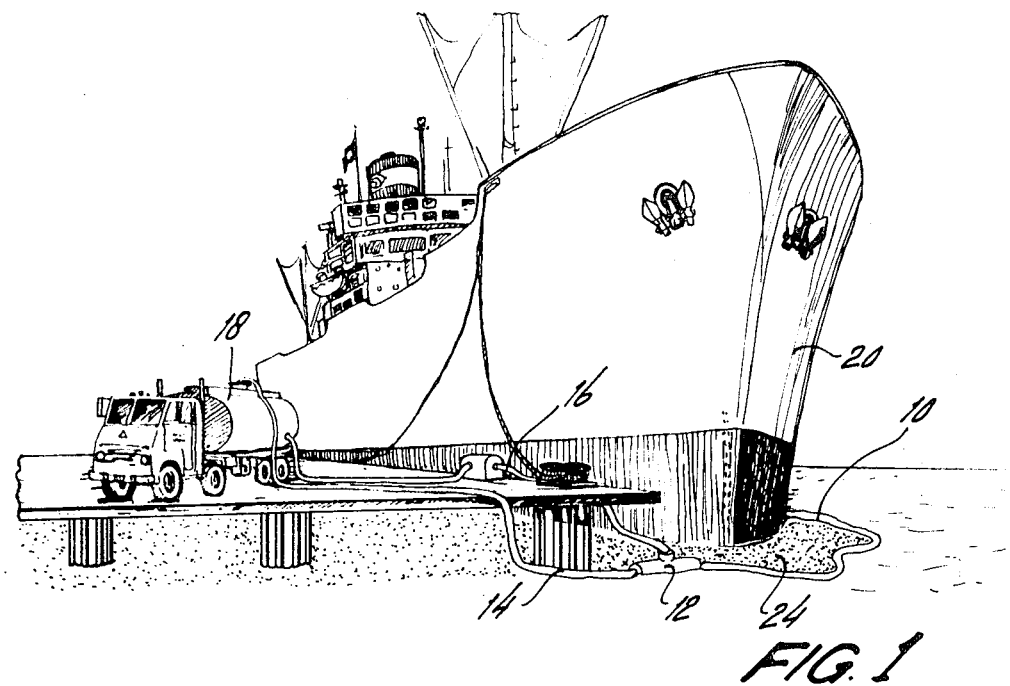
FIG. 1 is a perspective view of the present method adapted to the dockside confining and collecting of an oil slick.

In FIG. 1, buoyant confining and collecting boom 10 is represented as connected to eductor 12, having input 16 and discharge conduit 14, so as to flow oil into the system as an assistance in withdrawing the confined oil slick through the boom.

Figure 2:
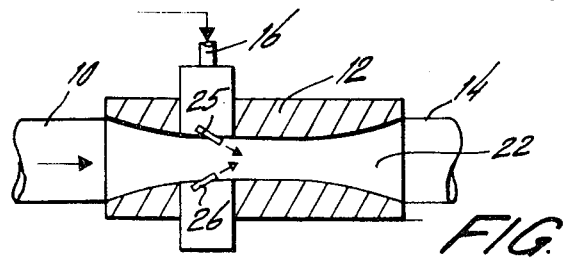
FIG. 2 is a fragmentary transverse section of an eductor used in connection with the collecting and confining hose.
Figure 3:
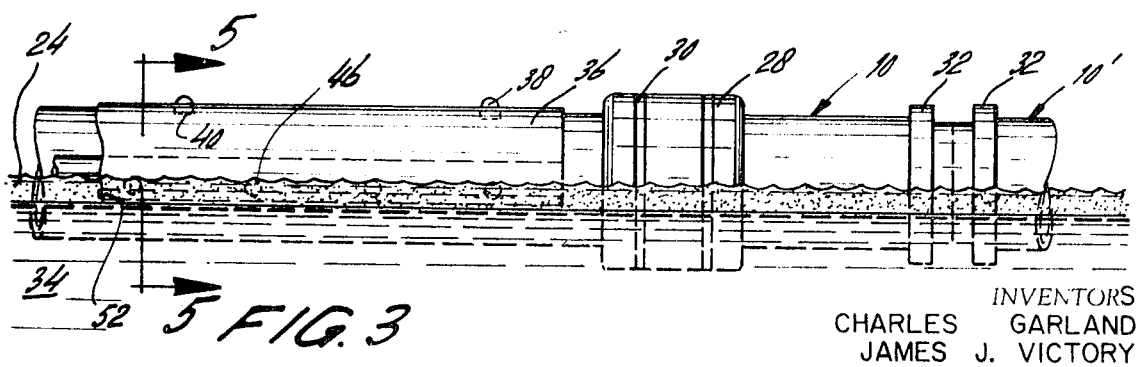
FIG. 3 is a fragmentary, partially sectional view of a confining and collecting hose used according to the present method.

In FIG. 2, eductor 12 is illustrated as including a plurality of jet nozzles 25 and 26 which direct the liquid motive flow from tank 18 through the discharge conduit 14, so as to entrain the ingested oil slick. In practical applications of this collector, it is an advantage to use the motive liquid flow from the storage tank rather than sea water. This arrangement uses recirculated suction liquid rather than external sea water, which would require twice the storage tank holding capacity. In FIG. 3, boom 10 and its counterpart 10' are secured in end-to-end relationship by means of an encircling clamp 32.

Figure 5:
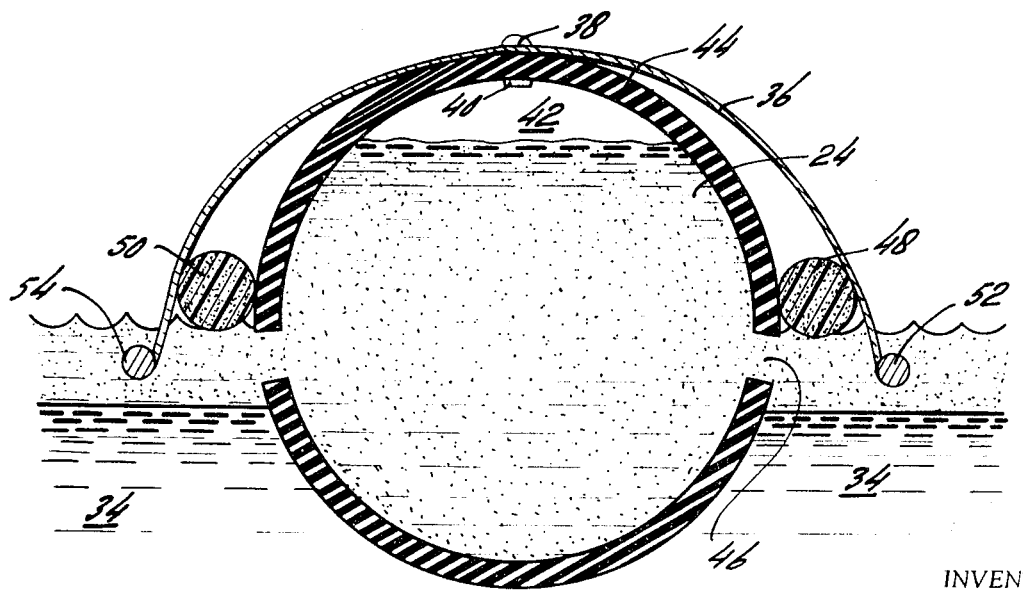
FIG. 5 is a transverse section of the boom, according to FIG. 3.

Boom 10 includes a plurality of laterally or horizontally aligned and graduated perforations 46. Perforations 46 are presented so as to engage the oil slick for ingestion, and their height may be adjusted by varying the size of of the buoyant floats 28. As illustrated in FIG. 5, the flexibly constructed air skirt 36 may depend on either side and be offset with respect to perforations 46, skirt 36 being connected to the boom top by means of bolt 38 and nut 40 or the like. Weights 52 and 54 may be presented at the ends of the skirts so as to hold the skirt as a shield within the oil slick interface. Additional buoyant floats 28 may encircle the boom and be held in place by means of clasps 30.

Figure 7:
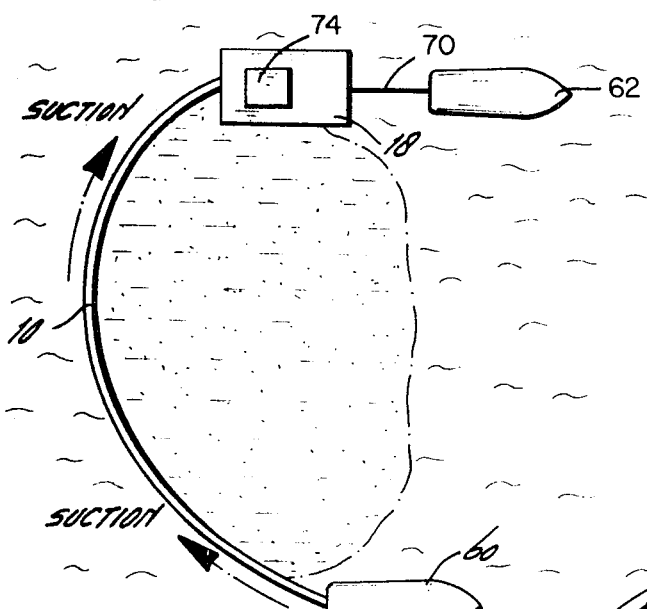
FIG. 7 is a schematic view, showing use of the boom at sea with two vessels.
Figure 8:
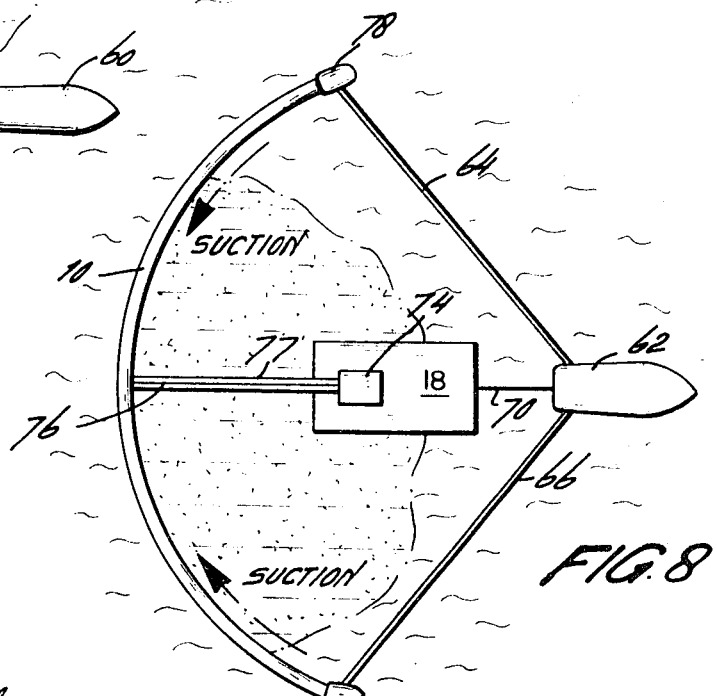
FIG. 8 is a further modification, showing use of the boom with a single towing vessel.
Figure 9:
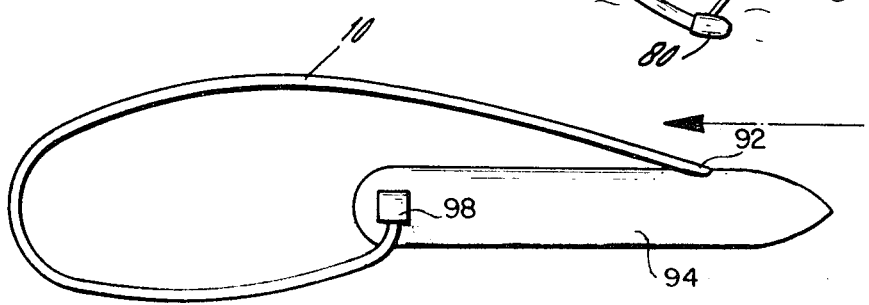
FIG. 9 is a further schematic view, showing the confining and collecting boom used as a weir.

Modifications of invention are illustrated in FIGS. 7, 8, and 9. In FIG. 7, the boom 10 is shown as supported at one end by means of tender 60 and at its other end extending into oil collection container 18 supporting pump 74 and towed by vessel 62 tow line 70.

In FIG. 8, the free ends of boom 10 are supported by float members 78 and 80, in turn towed by tether 64 and 66 which extend into a towing vessel 62. Towing vessel 62 also pulls oil container 18 via cable 70. A pump 74 may be supported upon container 18 and extend to the boom by means of conduits 76 and 77.

In FIG. 9, the weir concept is illustrated, where boom 10 forms a weir which extends from pump 98 mounted upon a tanker or like vessel 94. The boom is distended as a weir such that its other end 92 is closed into the free board of vessel 94.

As will be apparent, buoyancy can be supplied by external buoyant floats attached to the member or by the choice of materials of construction of boom 10. Perforations 46 must be carefully designed and spaced in the below fluid surface portion of the boom, so that it is communicant with the oil slick and sea water mixture. There is considerable discretion involved in designing these perforations. For example, if the holes are below the oil slick, then a high percentage of water will be pumped. If the holes are too large, a vortex to the surface with air ingestion will result, and, if the holes are too small, oil may be preferentially excluded. Detailed testing of the design parameters for the perforations are required to ensure success and efficiency with this pumping device.

By connecting tubular member 10 to a suction pumping means 74, the oil slick may be removed from the water surface and discharged to a holding tank or an oil water separator. Various types of pumping means 74 may be employed using commercially available equipment. The choice of pumps will depend somewhat on the circumstances of the oil slick and what equipment is available at the location of the oil slick.

By example, an eductor 12 may be employed. The eductor mixes the motive flow with the suction flow and would discharge via conduit 14 into the tank truck. An eductor offers several advantages, since it can carry large amounts of air-fluid mixtures without losing suction. The eductor has the capability of easily passing solids through the internals and imparts minimum turbulence, thereby tending to minimize emulsification of the oil in contrast with the effects of a centrifugal or rotary pump. The eductor may be connected to the motive pump in a manner which recirculates the oil-water mixture from the storage tank. This arrangement is illustrated in FIG. 1 and would eliminate the use of sea water for the motive fluid which would require twice the storage tank holding capacity.

Figure 4:
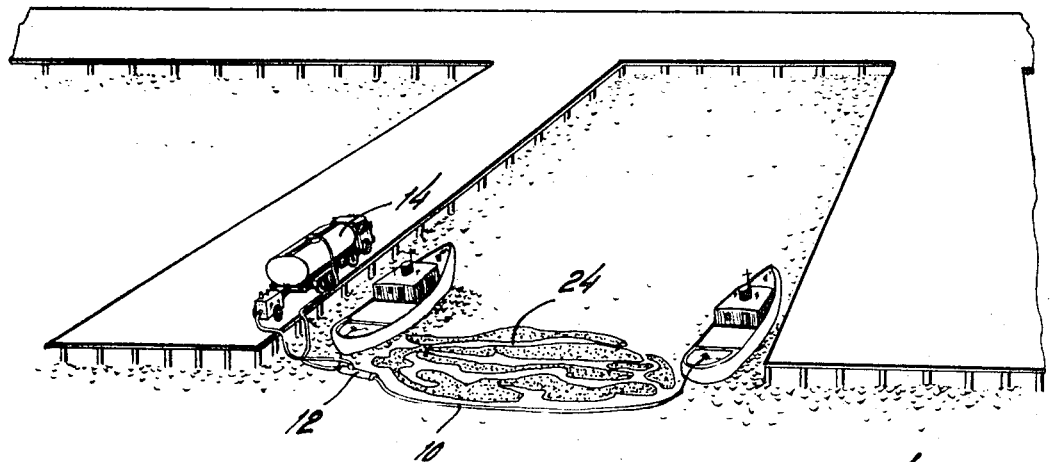
FIG. 4 is a perspective view of another modification, wherein dockside confining and collecting is accomplished with the aid of a vessel tending the free end of the collecting boom.
Figure 6:
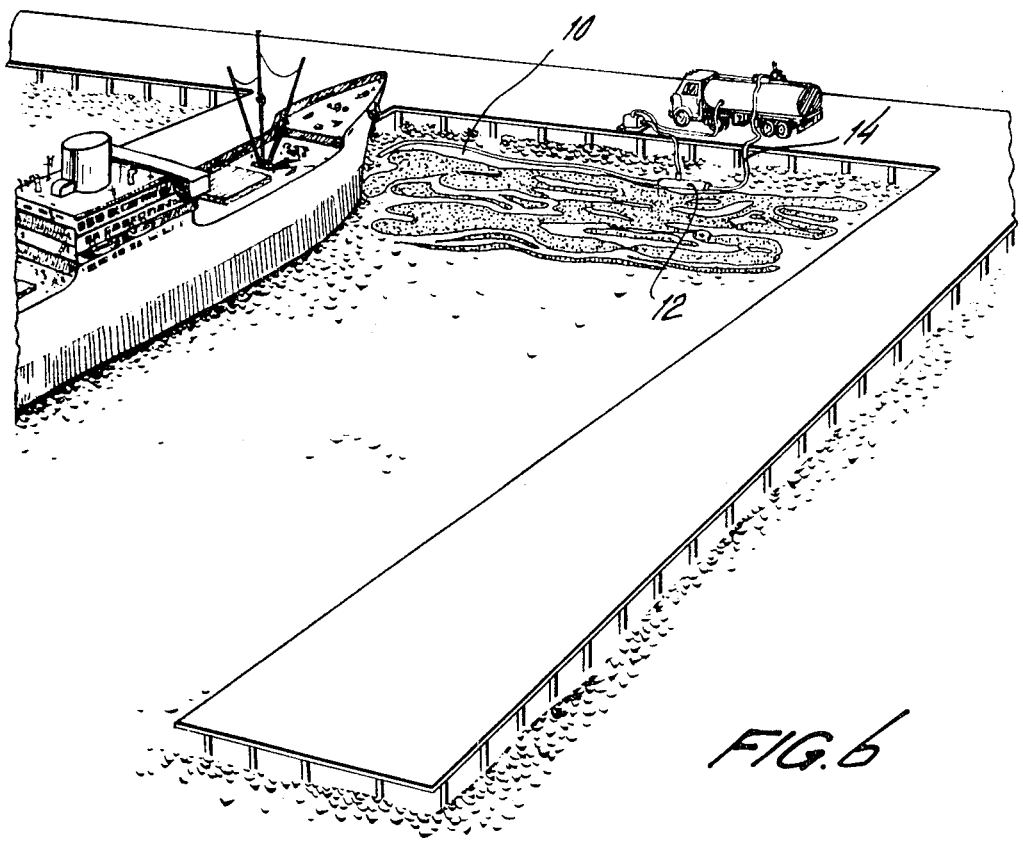
FIG. 6 is a perspective view, showing further use of the confining boom at dockside.

As illustrated in FIGS. 1, 4, and 6, the buoyant perforated boom could be employed to recover oil in areas around piers where larger, harder to handle devices could not be employed. The boom would be efficient in recovering the oil slick since it can be employed in a determined length and geometry to surround, border, or be within the oil slick.

The hose 10 can be stored in a conventional manner on reels or racks. Deployment of the hose could be made from a pier. Small boats may also be used to aid in the positioning of the hose.

Figure 10:
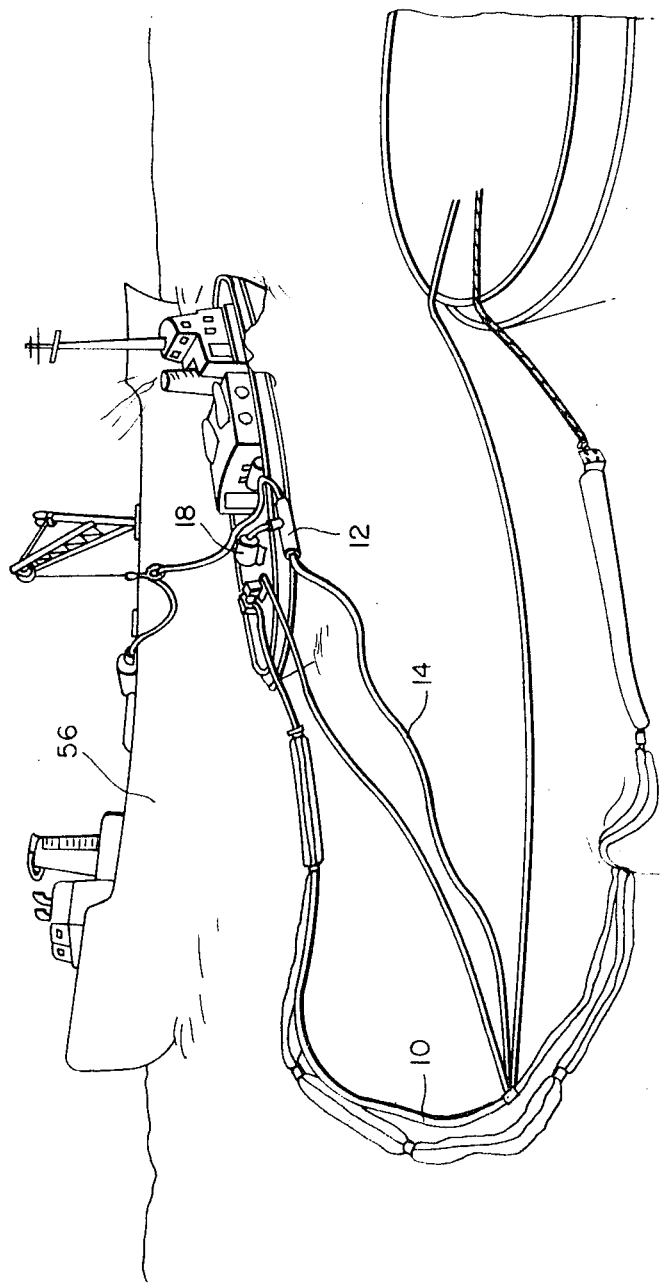
Figure 11:
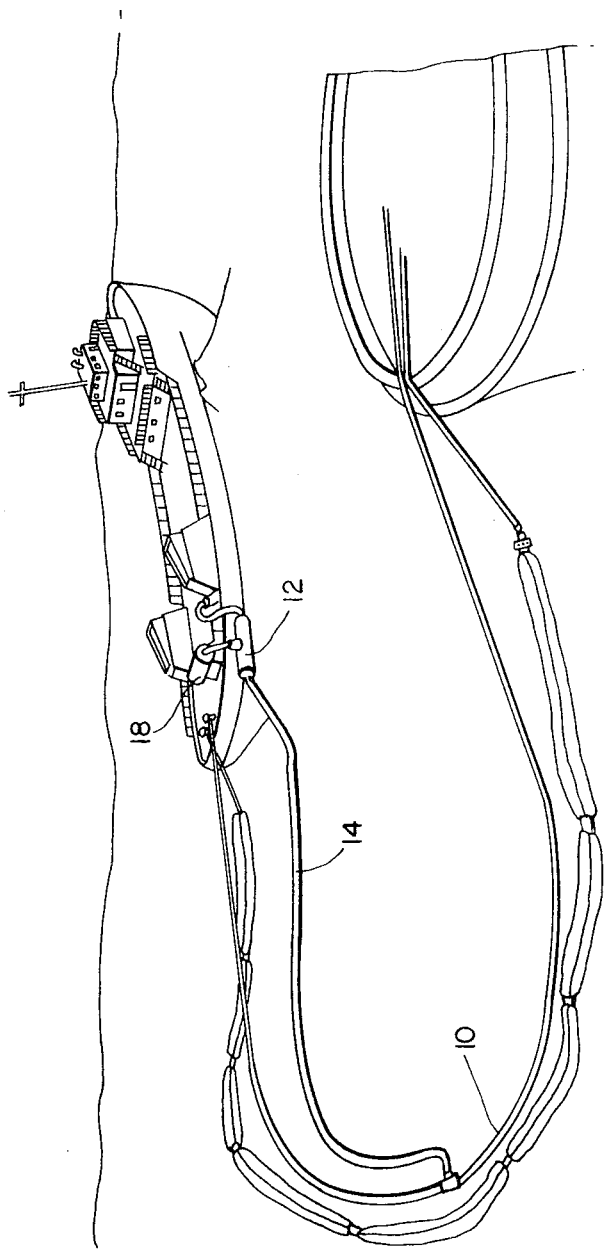
FIG. 11 is a perspective view of the present boom being used in conjunction with a confining boom of the type described in the parent application, the collected discharge being pumped into a collecting tank aboard the supply boat.
Figure 12:
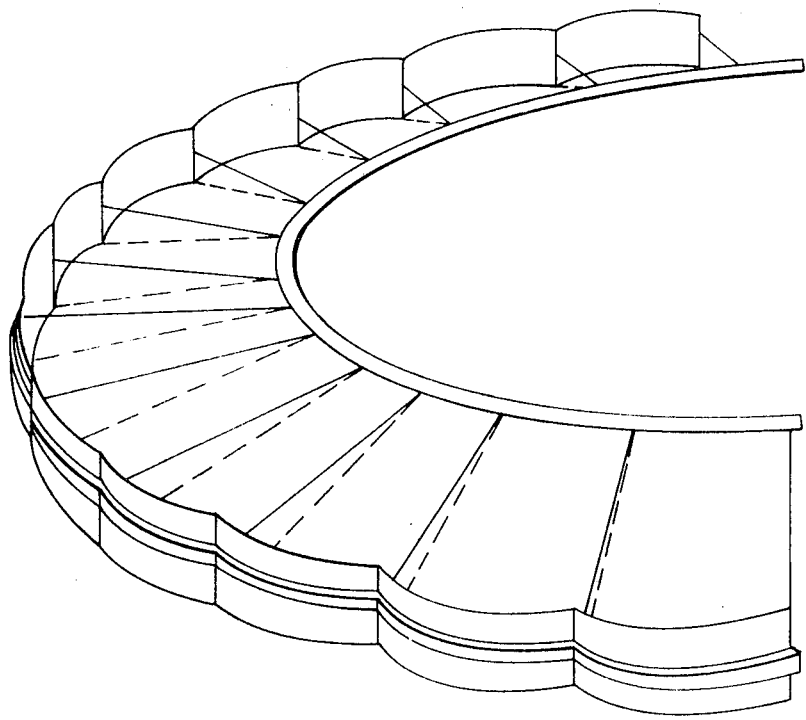
FIG. 12 is a schematic view of the type of confining boom described in the parent application.

Another application area for a buoyant hose collector would be oil slicks in the deep ocean waters resulting from ship or platform spills, as illustrated in FIGS. 7–11. The hose will have the ability to follow wave contours and will be able to stay submerged. For larger ocean spills, the collector hose would be larger in diameter than the size of the inshore or harbor-type collector. The buoyant hose collector can be used in, for example, the containment boom, described in the parent application, in conjunction with another containment boom. This arrangement is shown in FIGS. 10 and 11. The containment boom itself is illustrated in FIG. 12, as including principally skirt, float, tension member, and tether elements.

In FIG. 10, the collector hose 10 is employed inside a containment boom with the discharge being fed to a nearby tank ship 56. FIG. 11 shows the collector hose with a different towing arrangement and discharging to tanks aboard a supply boat.

Manifestly, variation in boom construction may be employed without departing from the spirit of the invention, as disclosed.

We claim:

1. Method of confining and collecting an immiscible slick from the surface of a body of water, comprising:
    A. buoyantly supporting a perforated boom upon said body of water and in contact with said slick, said boom including an oil eduction means at one end;
    B. attaching a skirt depending from the boom and extending over said perforations with a lower edge below the surface of said body of water;
    C. supporting an oil collecting receptacle in communication with said oil eduction means;
    D. providing pumping means to remove oil from said receptacle and supply said oil to said eduction means whereby oil is collected through said perforations in said boom and conveyed to said receptacle by said eduction means.

2. Method of confining and collecting an oil slick floating upon the surface of the body of water as in claim 1, wherein said skirt is attached at the top of said boom so as to extend laterally downwardly into the ambient air/slick interface on both sides of said boom so as to prevent air ingestion through said perforations.

3. An oil slick confining and collecting boom of type which can be floated upon the surface of a polluted body of water comprising:
   A. a resilient boom having a series of laterally extending perforations on both sides;
   B. a skirt supported over the upper portion of said boom, so as to extend downwardly in offset relation with respect to said perforations with a lower edge below the surface of said body of water;
   C. at least one buoy attached to said boom such that said perforations extend into an oil slick floating upon the surface of said polluted water.
   D. an eductor located at one end of said boom;
   E. an oil collection receptacle independently supported in communication with said eductor; and
   F. a pump connected to said oil collection receptacle and means communicating between said pump and said eductor, whereby oil is removed from said receptacle and supplied to said eductor so that oil is collected through said perforation in said boom and conveyed to said receptacle by said eductor.

4. An oil slick confining and collecting boom as in claim 3, including:
   E. a weight means connected to said skirt, so as to project the bottom of said skirt into said oil slick.

5. An oil slick confining and collecting boom as in claim 4, wherein said boom perforations extend on both sides of said boom, and said skirt is secured at the top of said boom and extends peripherally over the sides of said boom and into the oil slick, so as to shield said perforations from the ingestion of air, as said boom rolls and pitches.

6. An oil slick confining and collecting boom as in claim 3, wherein said weights are supported at the bottom end of said skirt on either side of said boom and said buoy is interposed between said boom and said skirt above said lateral perforations.

* * * * *